United States Patent
Kobayashi et al.

(10) Patent No.: US 10,017,642 B2
(45) Date of Patent: Jul. 10, 2018

(54) POLYAMIDE RESIN COMPOSITION, MOLDED ARTICLE, AND METHOD FOR MANUFACTURING MOLDED ARTICLE

(71) Applicant: Mitsubishi Gas Chemical Company, Inc., Tokyo (JP)

(72) Inventors: Masayuki Kobayashi, Kanagawa (JP); Tomonori Kato, Kanagawa (JP); Takafumi Oda, Kanagawa (JP)

(73) Assignee: Mitsubishi Gas Chemical Company, Inc., Tokyo (JP)

( * ) Notice: Subject to any disclaimer, the term of this patent is extended or adjusted under 35 U.S.C. 154(b) by 0 days.

(21) Appl. No.: 15/527,963

(22) PCT Filed: Nov. 4, 2015

(86) PCT No.: PCT/JP2015/080987
§ 371 (c)(1),
(2) Date: May 18, 2017

(87) PCT Pub. No.: WO2016/080185
PCT Pub. Date: May 26, 2016

(65) Prior Publication Data
US 2017/0313879 A1    Nov. 2, 2017

(30) Foreign Application Priority Data

Nov. 19, 2014  (JP) ................. 2014-234249

(51) Int. Cl.
| | | |
|---|---|---|
| C08L 77/06 | (2006.01) | |
| C08G 69/26 | (2006.01) | |
| B29K 77/00 | (2006.01) | |
| B29C 45/00 | (2006.01) | |
| B29K 433/00 | (2006.01) | |

(52) U.S. Cl.
CPC ............ *C08L 77/06* (2013.01); *C08G 69/265* (2013.01); *B29C 45/0001* (2013.01); *B29K 2077/00* (2013.01); *B29K 2433/00* (2013.01); *C08L 2201/08* (2013.01); *C08L 2203/20* (2013.01)

(58) Field of Classification Search
None
See application file for complete search history.

(56) References Cited

U.S. PATENT DOCUMENTS

| | | |
|---|---|---|
| 2002/0142179 A1 | 10/2002 | Nanba et al. |
| 2010/0130677 A1 | 5/2010 | Amici et al. |
| 2011/0207838 A1 | 8/2011 | Lima |
| 2013/0150517 A1 | 6/2013 | Tarbit et al. |
| 2013/0172460 A1* | 7/2013 | Mitadera ............... C08G 69/26 524/195 |

FOREIGN PATENT DOCUMENTS

| | | |
|---|---|---|
| EP | 2423263 | 2/2012 |
| JP | 60-86161 A | 5/1985 |
| JP | 10-278202 A | 10/1998 |
| JP | 11-021446 | 1/1999 |
| JP | 2002-226612 | 8/2002 |
| JP | 2003-213011 A | 7/2003 |
| JP | 2011-57930 A | 3/2011 |
| JP | 2011-105822 | 6/2011 |
| JP | 2013-521343 A | 6/2013 |
| JP | 2013-241628 A | 12/2013 |
| JP | 2014-503003 A | 2/2014 |
| WO | 2010/061128 A1 | 6/2010 |

OTHER PUBLICATIONS

International Preliminary Report on Patentability and Written Opinion for PCT/JP2015/080987 dated Jun. 1, 2017; English translation submitted herewith (11 pages).
International Search Report dated Jan. 12, 2016, for PCT/JP2015/080987 and English translation of the same (5 pages).

* cited by examiner

*Primary Examiner* — Ana L Woodward
(74) *Attorney, Agent, or Firm* — Fitch, Even, Tabin & Flannery LLP

(57) ABSTRACT

Provided is a polyamide resin composition capable of achieving high toughness and high breaking strain at the same time. Also provided is a molded article produced by molding the polyamide resin composition, and a method for manufacturing the molded article using the polyamide resin composition. A polyamide resin composition comprising: 100 parts by weight of polyamide resin (A) that is composed of a structural unit derived from diamine and a structural unit derived from dicarboxylic acid, and 0.05 to 0.45 parts by weight of an olefin-maleic anhydride copolymer (B), wherein 50 mol % or more of the structural unit derived from diamine is derived from at least one of metaxylylenediamine and paraxylylenediamine; the molar ratio of the structural unit derived from metaxylylenediamine and the structural unit derived from paraxylylenediamine is 100:0 to 40:60; 50 mol % or more of the structural unit derived from dicarboxylic acid is derived from sebacic acid; and the polyamide resin (A) has a terminal amino group concentration of 10 to 30 μeq/g.

13 Claims, No Drawings

POLYAMIDE RESIN COMPOSITION, MOLDED ARTICLE, AND METHOD FOR MANUFACTURING MOLDED ARTICLE

CROSS-REFERENCE TO RELATED APPLICATIONS

This application is a U.S. national phase application filed under 35 U.S.C. § 371 of International Application PCT/JP2015/080987, filed on Nov. 4, 2015, designating the U.S., which claims priority from Japanese Application Number 2014-234249, filed Nov. 19, 2014, which are hereby incorporated herein by reference in their entirety.

Field of the Invention

This invention relates to a novel polyamide resin composition, a molded article produced by molding the polyamide resin composition, and a method for manufacturing the molded article using the polyamide resin composition.

Background of the Invention

Polyamide resin is an engineering plastic having excellent mechanical strength such as impact resistance, friction resistance and wear resistance, also having excellent heat resistance and oil resistance, and has widely been used in the fields of automotive parts, electronic/electric equipment parts, office automation equipment parts, mechanical parts, and construction material/housing equipment parts, and even in increasing fields of application.

Metaxylylene adipamide resin, obtained from metaxylylenediamine and adipic acid (also referred to as "MXD6", hereinafter) has aromatic rings in the principal chain, a high rigidity, and is suitable for molding precision equipment. The resin is therefore understood to be a very excellent polyamide resin. In recent years, MXD6 has become widely used as a molding material, in particular as an injection-molding material, in the fields of automotive and other transportation equipment parts, general machinery parts, precision equipment parts, electronic/electric equipment parts, leisure and sports goods, and civil engineering and construction materials.

However, owing to its high rigidity, MXD6 intrinsically suffers from low toughness typically represented by elongation and flexibility. A technique of adding an elastomer, having been known to improve the toughness of MXD6, has unfortunately degraded other performances.

Patent Literature 1 describes addition, to the polyamide resin, of an additive selected from the group consisting of a) maleic anhydride-grafted ethylene/α-olefin; b) maleic anhydride-grafted ethylene/α-olefin/diene (EPDM) terpolymer; c) block polymer composed of maleic anhydride-grafted styrene/ethylene-butylene/styrene triblock (SEBS); d) acid copolymer, and e) combinations of them.

Patent Literature 2 discloses a polyamide-containing composition having an olefin-maleic anhydride polymer (OMAP).

Patent Literature 3 discloses an impact-resistant polyamide resin composition that includes polyamide (A) composed of a diamine unit containing 70 mol % or more of paraxylylenediamine unit and a dicarboxylic acid unit containing 70 mol % or more of a straight-chain aliphatic dicarboxylic acid unit having 6 to 18 carbon atoms; and modified polyolefin (B), wherein 0.5 to 50 parts by mass of modified polyolefin (B) is contained per 100 parts by mass of polyamide (A).

Patent Literature 4 discloses a composition that includes at least (a) and (b) below:

(a) polyamide 6 or 66, obtained by polymerizing a monomer of nylon 6 or nylon 66, under the presence of mono-functional and/or bi-functional compound having a carboxylic functional group(s), having a melt flow index of 10 g/10 min or larger when measured in accordance with ISO1133 standard at 275° C. and under a 325 g load; wherein an excessive aliphatic or aromatic monocarboxylic acid or dicarboxylic acid is used to make the ratio of terminal acidic group of the nylon 6 or nylon 66 different at least two times the ratio of the terminal amine group of the nylon 6 or nylon 66; and (b) an impact modifier having one or more functional groups capable of reacting with the polyamide (a).

CITATION LIST

Patent Literature

[Patent Literature 1] JP-T2-2013-521343
[Patent Literature 2] JP-T2-2014-503003
[Patent Literature 3] JP-A-2011-57930
[Patent Literature 4] JP-A-2013-241628

SUMMARY OF THE INVENTION

The present inventor, however, found from our thorough examination that none of the compositions described in the aforementioned literatures were not always satisfactory from the viewpoint of balancing high toughness and high breaking strain.

This invention, conceived in consideration of the prior art described above, is to provide a polyamide resin composition capable of achieving high toughness and high breaking strain at the same time, and also to provide a molded article produced by molding the polyamide resin composition, and a method for manufacturing the molded article using the polyamide resin composition.

Under such circumstances, the present inventors found from the examination that the problems above can be solved by using a predetermined polyxylylene sebacamide as the polyamide resin, and, by mixing an olefin-maleic anhydride copolymer according to a predetermined ratio.

More specifically, the problems above were solved by the means <1> below, and preferably by means <2> to <11> below.

<1> A polyamide resin composition comprising: 100 parts by weight of polyamide resin (A) that is composed of a structural unit derived from diamine and a structural unit derived from dicarboxylic acid, and 0.05 to 0.45 parts by weight of an olefin-maleic anhydride copolymer (B), wherein 50 mol % or more of the structural unit derived from diamine is derived from at least one of metaxylylenediamine and paraxylylenediamine; the molar ratio of the structural unit derived from metaxylylenediamine and the structural unit derived from paraxylylenediamine is 100:0 to 40:60; 50 mol % or more of the structural unit derived from dicarboxylic acid is derived from sebacic acid; and the polyamide resin (A) has a terminal amino group concentration of 10 to 30 μeq/g.

<2> The polyamide resin composition of <1>, wherein the molar ratio of olefin and maleic anhydride that composes the olefin-maleic anhydride copolymer (B) is 1:0.5 to 1:1.5.

<3> The polyamide resin composition of <1> or <2>, wherein the olefin is ethylene.

<4> The polyamide resin composition of any one of <1> to <3>, wherein the polyamide resin (A) has a melt viscosity of 600 to 1500 Pa·s when measured at 250° C., under a retention time of 6 minutes and a shear rate of 121.6 s$^{-1}$.

<5> The polyamide resin composition of any one of <1> to <4>, wherein the polyamide resin (A) has a melt viscosity measured at 250° C., under a retention time of 6 minutes, and a shear rate of 1216 s$^{-1}$ of 260 to 500 Pa·s.

<6> The polyamide resin composition of any one of <1> to <5>, wherein the polyamide resin composition has a relative viscosity measured in accordance with ISO 307 of 1.6 to 3.2.

<7> The polyamide resin composition of any one of <1> to <6>, wherein the molar ratio of the structural unit derived from metaxylylenediamine and the structural unit derived from paraxylylenediamine is 100:0 to 51:49.

<8> The polyamide resin composition of any one of <1> to <7>, wherein 70 mol % or more of the structural unit derived from diamine is derived from at least one of metaxylylenediamine and paraxylylenediamine.

<9> The polyamide resin composition of any one of <1> to <8>, wherein the polyamide resin (A) has a terminal amino group concentration of 15 to 25 µeq/g.

<10> A molded article obtained by molding the polyamide resin composition described in any one of <1> to <9>.

<11> A method for manufacturing the molded article, comprising injection-molding of the polyamide resin composition described in any one of <1> to <9>.

According to this invention, it now became possible to provide a polyamide resin composition capable of achieving high toughness and high breaking strain at the same time, and also to provide a molded article produced by molding the polyamide resin composition, and a method for manufacturing the molded article using the polyamide resin composition.

DESCRIPTION OF MODES

This invention will be detailed below. In this specification, all numerical ranges given using "to", placed between numerals, mean the ranges containing both numerals as the lower and upper limit values.

A polyamide resin composition of this invention includes 100 parts by weight of polyamide resin (A) that is composed of a structural unit derived from diamine and a structural unit derived from dicarboxylic acid, and 0.05 to 0.45 parts by weight of an olefin-maleic anhydride copolymer (B), 50 mol % or more of the structural unit derived from diamine being derived from at least one of metaxylylenediamine and paraxylylenediamine, the molar ratio of the structural unit derived from metaxylylenediamine and the structural unit derived from paraxylylenediamine being 100:0 to 40:60, 50 mol % or more of the structural unit derived from dicarboxylic acid being derived from sebacic acid, and the terminal amino group concentration of the polyamide resin (A) being 10 to 30 µeq/g (microequivalent/g). With such configuration, it is now possible to provide a polyamide resin composition capable of achieving high toughness and high breaking strain at the same time.

Although the mechanism remains unclear, the maleic anhydride moiety of the olefin-maleic anhydride copolymer (B) reacts with the terminal amino group of the polyamide resin (A), to form a crosslinked structure between the olefin-maleic anhydride copolymer (B) and the polyamide resin (A), thereby the molecular weight (melt viscosity) of the polyamide resin (A) increases, and this supposedly achieves high elastic modulus and high breaking strain at the same time.

<Polyamide Resin (A)>

The polyamide resin composition of this invention contains the polyamide resin (A) that is composed of a structural unit derived from diamine and a structural unit derived from dicarboxylic acid, 50 mol % or more of the structural unit derived from diamine being derived from at least one of metaxylylenediamine and paraxylylenediamine, the molar ratio of the structural unit derived from metaxylylenediamine and the structural unit derived from paraxylylenediamine being 100:0 to 40:60, and 50 mol % or more of the structural unit derived from dicarboxylic acid being derived from sebacic acid.

Only a single species, or two or more species of the polyamide resin (A) may be used. When two or more species are contained, the total amount is defined as the amount of polyamide resin (A). Hereinafter, the same will apply to other components.

In the diamine that composes the structural unit derived from diamine, 50 mol % or more thereof is derived from at least one of metaxylylenediamine and paraxylylenediamine, preferably 70 mol % or more, and more preferably 90 mol % or more thereof is derived from at least one of metaxylylenediamine and paraxylylenediamine.

The molar ratio of the structural unit derived from metaxylylenediamine and the structural unit derived from paraxylylenediamine (structural unit derived from metaxylylenediamine:structural unit derived from paraxylylenediamine) is 100:0 to 40:60, preferably 100:0 to 51:49, more preferably 100:0 to 60:40, and even more preferably 80:20 to 60:40. Within these ranges, the toughness will tend to be improved, and also the breaking strain will tend to be improved.

Diamines other than metaxylylenediamine and paraxylylenediamine are exemplified by aliphatic diamines such as tetramethylenediamine, pentamethylenediamine, 2-methylpentanediamine, hexamethylenediamine, heptamethylenediamine, octamethylenediamine, nonamethylenediamine, decamethylenediamine, dodecamethylenediamine, 2,2,4-trimethyl-hexamethylenediamine, and 2,4,4-trimethyl-hexamethylenediamine; alicyclic diamines such as 1,3-bis(aminomethyl)cyclohexane, 1,4-bis(aminomethyl)cyclohexane, 1,3-diaminocyclohexane, 1,4-diaminocyclohexane, bis(4-aminocyclohexyl)methane, 2,2-bis(4-aminocyclohexyl)propane, bis(aminomethyl)decalin, and bis(aminomethyl)tricyclodecalin; and aromatic diamines such as bis(4-aminophenyl)ether, paraphenylenediamine, and bis(aminomethyl)naphthalene. They may be used independently, or in combination of two or more species.

In the polyamide resin (A) used in this invention, 50 mol % or more of the structural unit derived from dicarboxylic acid is derived from sebacic acid. Preferably 70 mol % or more, and more preferably 90 mol % or more thereof is derived from sebacic acid.

Dicarboxylic acids other than sebacic acid are exemplified by aliphatic dicarboxylic acids such as succinic acid, glutaric acid, pimelic acid, suberic acid, azelaic acid, adipic acid, undecanedioic acid, and dodecanedioic acid; and aromatic dicarboxylic acids such as isophthalic acid, terephthalic acid, orthophthalic acid, 1,2-naphthalenedicarboxylic acid, 1,3-naphthalenedicarboxylic acid, 1,4-naphthalenedicarboxylic acid, 1,5-naphthalenedicarboxylic acid, 1,6-naphthalenedicarboxylic acid, 1,7-naphthalenedicarboxylic acid, 1,8-naphthalenedicarboxylic acid, 2,3-naphthalenedicarboxylic acid, 2,6-naphthalenedicarboxylic acid, and 2,7-naphthalenedicarboxylic acid. They may be used independently, or in combination of two or more species.

Besides the diamine component and the dicarboxylic acid component, the polyamide resin (A) in this invention can also contain, as a copolymerizing component, lactams such as ε-caprolactam and laurolactam, and aliphatic aminocarboxylic acids such as aminocaproic acid and aminoundecanoic acid, without damaging the effects of this invention. The content of the components other than the diamine component and the dicarboxylic acid component may typically be 5% by mass or less of the polyamide resin (A).

The polyamide resin (A) used in this invention has a terminal amino group concentration of 10 to 30 μeq/g. The terminal amino group concentration of the polyamide resin (A) is preferably 15 to 25 μeq/g, and more preferably 15 to 20 μeq/g. Within these ranges, the toughness will tend to be improved. Also the breaking strain will tend to be improved.

The terminal amino group concentration of the polyamide resin (A) used in this invention is defined as a value measured by a method described later in EXAMPLES of this specification. If the measuring instrument described later in EXAMPLES is not readily available, any other equivalent instrument may be employed (the same will apply also to other methods of measuring).

The terminal carboxy group concentration ([COOH]) of the polyamide resin (A) used in this invention is preferably less than 150 μeq/g, more preferably 10 to 120 μeq/g, and even more preferably 10 to 100 μeq/g. By using the polyamide resin that satisfies such terminal group concentrations, the viscosity will tend to be stabilized, and the moldability will tend to be improved.

The terminal carboxy group concentration may be determined by dissolving 0.3 g of polyamide resin into 30 ml of benzyl alcohol under a nitrogen gas flow at 160 to 180° C., then cooling the mixture down to 80° C. under a nitrogen gas flow, further added with 10 mL of methanol under stirring, and then titrated using a N/100 aqueous sodium hydroxide solution.

The polyamide resin (A) used in this invention preferably has a ratio of the terminal amino group concentration relative to the terminal carboxy group concentration ([NH$_2$]/[COOH]) of 0.7 or smaller, more preferably 0.6 or smaller, and particularly 0.5 or smaller. Within these ranges, the moldability will tend to be improved.

The polyamide resin (A) used in this invention preferably has a number-average molecular weight (Mn) of 6,000 to 30,000. With the number-average molecular weight (Mn) controlled within the range from 6,000 to 30,000, the strength of the polyamide resin composition (molding material, molded article, etc.) will tend to be improved. The number-average molecular weight (Mn) is more preferably 8,000 to 28,000, even more preferably 9,000 to 26,000, yet more preferably 10,000 to 24,000, particularly 11,000 to 22,000, and furthermore preferably 12,000 to 20,000. Within these ranges, the heat resistance, elastic modulus, dimensional stability and moldability will be improved.

Now, the number-average molecular weight (Mn) in this context is calculated by the equation below, using the terminal amino group concentration [NH$_2$] (μeq/g) and the terminal carboxy group concentration [COOH] (μeq/g) of the polyamide resin:

Number-average molecular weight (Mn)=2,000,000/([COOH]+[NH$_2$])

The polyamide resin (A) used in this invention preferably has a polydispersity (weight-average molecular weight/number-average molecular weight (Mw/Mn)) of 1.8 to 3.1. The polydispersity is more preferably 1.9 to 3.0, and even more preferably 2.0 to 2.9. With the polydispersity controlled within these ranges, it will become easier to obtain polyamide resin composition (molding material, molded article, etc.) with improved mechanical characteristics.

The polydispersity may be determined by GPC measurement, and may more specifically be given as a standard polymethyl methacrylate (PMMA) equivalent value, through measurement using "HLC-8320GPC" measuring instrument from Tosoh Corporation combined with a refractive index detector (RI), two "TSKgel Super HM-H" columns from Tosoh Corporation, and a 10 mmol/l sodium trifluoroacetate solution in hexafluoroisopropanol (HFIP) as an eluant, conducted at a resin concentration of 0.02% by mass, a column temperature of 40° C., and a flow rate of 0.3 ml/min. The analytical curve is prepared by dissolving PMMA in HFIP, at six levels of concentration.

In this invention, the polyamide resin (A) preferably has a melting point of 150 to 310° C., and more preferably 180 to 300° C.

The polyamide resin (A) preferably has a glass transition point of 50 to 100° C., more preferably 55 to 100° C., and particularly 60 to 100° C. Within these ranges, the heat resistance will tend to be improved.

The melting point in this context means a temperature at which an endothermic peak becomes deepest in DSC (differential scanning calorimetry) during a heating process. The glass transition temperature in this context is measured after once heating and melting a sample so as to cancel any influences on the thermal history, and by heating it again. The measurement may be conducted typically by using "DSC-60" from Shimadzu Corporation, approximately 5 mg of the sample, and nitrogen as an atmospheric gas fed at a flow rate of 30 ml/min, at a heating rate of 10° C./min from room temperature up to a temperature above a predicted melting point so as to heat and melt the sample, wherein the melting point may be determined from the temperature where an endothermic peek becomes deepest. The glass transition point may be determined by quickly quenching the molten polyamide resin with dry ice, and then re-heating it at a heating rate of 10° C./min up to a temperature above the melting point.

The polyamide resin composition of this invention may contain a polyamide resin besides the polyamide resin (A). Specific examples include polyamides 6, 11, 12, 46, 66, 610, 612, 6I, 6/66, 6T/6I, 6/6T, 66/6T, 66/6T/6I, other polyamide MX, polytrimethylhexamethylene terephthalamide, polybis (4-aminocyclohexyl)methane dodecamide, polybis(3-methyl-4-aminocyclohexyl)methane dodecamide, and poly-undecamethylene hexahydroterephthalamide, where "I" represents an isophthalic acid component, and "T" represents a terephthalic acid component.

The ratio of such other polyamide resin to the polyamide resin composition of this invention, when mixed therewith, preferably falls within the range from 5 to 30% by weight of the polyamide resin (A). Alternatively, the resin composition may be configured to contain substantially no such other polyamide resin. "To contain substantially no such other polyamide resin" in this context means, for example, that the ratio of such other polyamide resin is less than 5% by weight of the polyamide resin (A).

The polyamide resin composition of this invention may contain still other thermoplastic resin besides the polyamide resin (A), the olefin-maleic anhydride copolymer (B), and the other polyamide resin. Specific examples include polyphenylene ether resin, polystyrene resin, thermoplastic polyester resin, polyacetal resin, polyurethane resin, polylactide-based resin, polyolefin resin other than the olefin-maleic anhydride copolymer (B), and polyphenylene sulfide resin.

The ratio of such other thermoplastic resin to the polyamide resin composition of this invention, when mixed therewith, preferably falls within the range from 5 to 20% by weight of the thermoplastic resin. Alternatively, the resin composition may be configured to contain substantially no other thermoplastic resin. "To contain substantially no other thermoplastic resin" in this context means, for example, that the ratio of such other thermoplastic resin is less than 5% by weight of the thermoplastic resin.

In some cases, an elastomer would be added in order to improve the impact resistance. The elastomer will be described later.

<Olefin-Maleic Anhydride Copolymer (B)>

The polyamide resin composition of this invention contains the olefin-maleic anhydride copolymer (B).

The olefin-maleic anhydride copolymer (B) is formed by co-polymerizing maleic anhydride and an olefinic monomer. It does not, however, preclude that any other copolymerizable component is contained without departing from the spirit of this invention.

Examples of the olefin include ethylene, propylene, isobutylene, butene-1, octene, butadiene, styrene, isoprene, hexene, and long-chain alkenes (dodecene, dedecene-1, tetradecene, etc.). Ethylene, propylene and isobutylene are preferable, and ethylene is more preferable. Some of these olefins are derived from natural gas and/or crude oil, whereas some of them may be derived from natural substances or obtained by biosynthesis.

Examples of the copolymer include ethylene-maleic anhydride copolymer, propylene-maleic anhydride copolymer, and isobutylene-maleic anhydride copolymer. The copolymer may be a copolymer composed of two or more species of olefins and maleic anhydride, where the olefins in this case are preferably two or more species selected from ethylene, propylene and isobutylene. A specific example is an ethylene-propylene-maleic anhydride terpolymer.

The molar ratio of the olefin(s) and maleic anhydride is preferably 1:0.5 to 1:1.5, more preferably 1:0.8 to 1:1.2, even more preferably 1:0.9 to 1:1.1, and substantially 1:1. In another embodiment, the molar ratio of the olefin(s) and maleic anhydride may be 1:99 to 70:30, and may further be 1:50 to 50:1, or 1:20 to 20:1, or 1:10 to 10:1, or 1:5 to 5:1, or 1:2 to 2:1.

The olefin(s) and maleic anhydride may form an alternating copolymer or a random copolymer. The alternating copolymer is preferable.

The olefin-maleic anhydride copolymer (B) may have copolymerized therein monomer(s) other than the olefin and maleic anhydride, without damaging the effects of this invention, wherein the content thereof is preferably 5% by mass or less of the total olefin-maleic anhydride copolymer (B).

The olefin-maleic anhydride copolymer (B) has the weight-average molecular weight (Mw) within the range from 300 to 1,000,000, or from 10,000 to 1,000,000, or from 20,000 to 800,000, or from 40,000 to 600,000, or from 50,000 to 500,000, or from 60,000 to 400,000.

Commercially available products include ZeMac (registered trademark) E-60 (E60), and ZeMac E-400 from Vertellus Specialties Inc.

The polyamide resin composition of this invention contains 0.05 to 0.45 parts by weight of olefin-maleic anhydride copolymer (B) per 100 parts by weight of polyamide resin (A). Although the olefin-maleic anhydride copolymer (B) can fully demonstrate the effect if the amount of addition, per 100 parts by weight of polyamide resin (A), is 0.05 parts by weight at lowest, the content may be 0.08 parts by weight or more, may preferably be 0.1 parts by weight or more, and may particularly be 0.2 parts by weight or more. The upper limit value is preferably 0.40 parts by weight or below, and even may be 0.35 parts by weight or below. Only a single species of the olefin-maleic anhydride copolymer (B) may be contained, or two or more species may be contained.

<Other Additives>

Besides the above-described substances, the polyamide resin composition of this invention may contain various organic or inorganic fillers in the powdery, fibrous, granular or plate form, elastomer, antioxidant, heat stabilizer, UV absorber, plasticizer, mold releasing agent, flame retardant, hydrolysis resistance modifier, weathering stabilizer, antistatic agent, nucleating agent, matting agent, dye/pigment, anticoloring agent, and antigelling agent.

Although the elastomer includes a maleic anhydride modified olefin-based elastomer, such maleic anhydride modified olefin-based elastomer is characterized by only a small ratio of modification with maleic anhydride, and is clearly discriminated from the olefin-maleic anhydride copolymer (B). More specifically, the maleic anhydride modified olefin-based elastomer in this context typically has a molar ratio of maleic anhydride of less than 30%.

As one embodiment of the polyamide resin composition of this invention, exemplified is a polyamide resin composition whose total content of the polyamide resin and the filler accounts for 70% by weight or more of the composition.

As still another embodiment of the polyamide resin composition of this invention, exemplified is a polyamide resin composition in which the polyamide resin accounts for 70% by weight or more of the composition.

<Performances of Polyamide Resin Composition>

In the polyamide resin composition of this invention, the polyamide resin (A) preferably has a melt viscosity of 600 to 1500 Pa·s when measured at 250° C., a retention time of 6 minutes, and a shear rate of 121.6 s$^{-1}$, and more preferably 700 to 1200 Pa·s. With such configuration, the polyamide resin composition will have an improved stability during molding.

Again in the polyamide resin composition of this invention, the polyamide resin (A) preferably has a melt viscosity of 260 to 500 Pa·s when measured at 250° C., a retention time of 6 minutes, and a shear rate of 1216 s$^{-1}$, and more preferably 280 to 400 Pa·s. With such configuration, the polyamide resin composition will have an improved stability during molding.

The polyamide resin composition of this invention preferably has a relative viscosity measured in accordance with ISO 307 of 1.6 or larger, more preferably 2.0 or larger, even more preferably 2.5 or larger, meanwhile preferably 3.2 or smaller, more preferably 3.0 or smaller, and even more preferably 2.9 or smaller. With such configuration, the polyamide resin composition will have an improved stability during molding.

The relative viscosity in this invention may be measured by a method described later in EXAMPLES.

The polyamide resin composition of this invention may have a unnotched Charpy impact strength of 70 kJ/m$^2$ or larger when measured in accordance with ISO 179, under an environment at 23° C., wherein the value may be 80 kJ/m$^2$ or larger, further may be 150 kJ/m$^2$ or larger, and may particularly be 160 J/m$^2$ or larger. The upper limit value of the unnotched Charpy impact strength may be, but not specifically limited to, 250 kJ/m² or below for example, depending on applications and so forth.

The polyamide resin composition of this invention may have a tensile breaking stress, in accordance with JIS K7161 and JIS K7162, of 50 MPa or larger, and even may be 58 MPa or larger. The upper limit value of the tensile breaking stress may be, but not specifically limited to, 80 MPa or below for example, depending on applications and so forth.

Meanwhile, the polyamide resin composition may have a tensile break induced strain, in accordance with JIS K7161 and JIS K7162, of 100% or larger, even may be 150% or larger, and yet may be 200% or larger. The upper limit value of the tensile break induced strain may be, but not specifically limited to, 300% or below for example, depending on applications and so forth.

<Method for Manufacturing Polyamide Resin Composition>

The polyamide resin composition may be manufactured by an arbitrary method. For example, the polyamide resin (A), the olefin-maleic anhydride copolymer (B), and other component(s) to be added optionally are mixed using a mixing means such as V-type blender to prepare a whole blend, and the whole blend is then melt-kneaded and pelletized using a vented extruder. Alternatively, two-stage kneading is exemplified, by which all components excluding a filler, such as glass fiber, are preliminarily and thoroughly mixed, then melt-kneaded and pelletized using a vented extruder, the resultant pellets and the filler such as glass fiber are mixed, and the mixture is melt-kneaded in a vented extruder.

Still alternatively, exemplified is a method by which a thorough mixture of all components, excluding a filler such as glass fiber, is preliminarily prepared using for example a V-type blender, the mixture is fed through a first chute of a vented twin-screw extruder, glass fiber is fed through a second chute that opens in the middle of extruder, and the feeds are then melt-kneaded and pelletized.

In a screw configuration in a kneading zone of the extruder, it is preferable to arrange an element for promoting kneading on the upstream side, and to arrange an element for elevating pressure on the downstream side.

The element for promoting kneading is exemplified by progressive kneading disc element, orthogonal kneading disc element, wide kneading disc element, and progressive mixing screw element.

The heating temperature of melt-kneading is properly selectable within the range from 230 to 300° C., depending on the melting point. If the temperature is too high, the polyamide resin composition tends to produce a decomposition gas, and may be clouded. It is therefore preferable to select a suitable screw configuration taking shear heating into consideration. From the viewpoint of suppressing decomposition of the composition during kneading or subsequent molding, it is preferable to use an antioxidant or heat stabilizer.

<Molded Article>

The molded article of this invention is produced by molding the polyamide resin composition of this invention. The method of molding is widely selectable from known methods of molding. Specific examples of the methods of molding include injection molding, blow molding, extrusion molding, compression molding, vacuum forming, press forming, direct blow molding, rotational molding, sandwich molding, and two-color formation. As one embodiment of the method for manufacturing the molded article of this invention, exemplified is a method based on injection molding of the polyamide resin composition of this invention. In this invention, injection molding is preferable since it can produce the molded article with high rigidity and high impact resistance.

The molded article of this invention is widely applicable to fiber, yarn, rope, tube, hose, film, sheet, various molding materials, various parts, and finished product. As the molding material, exemplified is a fiber reinforced resin material (prepreg, for example) having a continuous fiber impregnated into the polyamide resin composition of this invention. The continuous fiber used here is exemplified by carbon fiber and glass fiber. The polyamide resin composition of this invention is also usable as a resin for insert molding. More specifically, it is preferable to place a resin film, a prepreg and other insertion parts in dies, and then to inject the resin composition of this invention, to thereby integrate them. A resin composing the insertion parts is preferably polyamide resin, and preferably the polyamide resin composition of this invention. Of course, the resin composition of this invention may be used for composing the insertion parts. In this case, the resin to be injected is preferably a polyamide resin.

The field of application spreads widely without special limitation, covering automotive and other transportation equipment parts, general machinery parts, precision machinery parts, electronic/electric equipment parts, office automation equipment parts, construction material/housing equipment parts, medical equipment, leisure and sports goods, play equipment, commodities such as medicine or food-packaging film, and military and aerospace products.

EXAMPLES

This invention will further be detailed below referring to Examples. Note that materials, amounts of consumption, ratios, process details, and process procedures described in Examples below may properly be modified without departing from the spirit of this invention. Accordingly, the scope of this invention is by no means limited by the specific Examples illustrated below.

All Examples of this invention were conducted at 25° C., unless otherwise specifically noted.

<Polyamide Resin (A)>

Example of Synthesis 1

Synthesis of MPXD10-1

In a reaction vessel equipped with a stirrer, a partial condenser, a total condenser, a thermometer, a dropping funnel, a nitrogen injection tube, and a strand die, placed were 10 kg (49.4 mol) of sebacic acid (TA grade, from Itoh Oil Chemicals Co., Ltd.) and 11.66 g of sodium acetate/sodium hypophosphite monohydrate (molar ratio=1/1.5), the system was fully replaced with nitrogen, kept under stirring and under a nitrogen gas flow at a small flow rate, and the content was allowed to melt under heating up to 170° C.

Into the molten sebacic acid, 6.647 kg of mixed xylylenediamine (34.16 mol of metaxylylenediamine from Mitsubishi Gas Chemical Company, Inc. and 14.64 mol of paraxylylenediamine from Mitsubishi Gas Chemical Company, Inc.), with a ratio by mass of metaxylylenediamine and paraxylylenediamine of 70/30, was added dropwise under stirring, and the inner temperature was continuously elevated up to 240° C. over 2.5 hours, while eliminating the produced condensation water out from the system.

After completion of the dropwise addition, the inner temperature was elevated, and upon reaching 250° C., the reaction vessel was evacuated, the inner temperature was further elevated, and the melt polycondensation reaction was allowed to proceed at 255° C. for 20 minutes. The system was then pressurized with nitrogen gas, the resultant polymerized product was taken out from the strand die and then pelletized, to thereby obtain polyamide resin MPXD10-1.

Polyamide resin MPXD10-1 was found to have a number-average molecular weight of 17000.

Example of Synthesis 2

Synthesis of MPXD10-2 (Comparative Resin)

In a reaction vessel equipped with a stirrer, a partial condenser, a total condenser, a thermometer, a dropping funnel, a nitrogen injection tube, and a strand die, placed were 10 kg (49.4 mol) of sebacic acid (TA Grade, from Itoh Oil Chemicals Co., Ltd.) and 11.66 g of sodium acetate/sodium hypophosphite monohydrate (molar ratio=1/1.5), the system was fully replaced with nitrogen, kept under stirring and under a nitrogen gas flow at a small flow rate, and the content was allowed to melt under heating up to 170° C.

Into the molten sebacic acid, 6.623 kg of mixed xylylenediamine (34.04 mol of metaxylylenediamine from Mitsubishi Gas Chemical Company, Inc. and 14.59 mol of paraxylylenediamine from Mitsubishi Gas Chemical Company, Inc.), with a ratio by mass of metaxylylenediamine and paraxylylenediamine of 70/30, was added dropwise under stirring, and the inner temperature was continuously elevated up to 240° C. over 2.5 hours, while eliminating the produced condensation water out from the system.

After completion of the dropwise addition, the inner temperature was elevated, and upon reaching 250° C., the reaction vessel was evacuated, the inner temperature was further elevated, and the melt polycondensation reaction was allowed to proceed at 255° C. for 20 minutes. The system was then pressurized with nitrogen gas, the resultant polymerized product was taken out from the strand die and then pelletized, to thereby obtain polyamide resin MPXD10-2.

Polyamide resin MPXD10-2 was found to have a number-average molecular weight of 16000.

Example of Synthesis 3

Synthesis of MPXD10-3 (Comparative Resin)

In a reaction vessel equipped with a stirrer, a partial condenser, a total condenser, a thermometer, a dropping funnel, a nitrogen injection tube, and a strand die, placed were 10 kg (49.4 mol) of sebacic acid (TA Grade, from Itoh Oil Chemicals Co., Ltd.) and 11.66 g of sodium acetate/sodium hypophosphite monohydrate (molar ratio=1/1.5), the system was fully replaced with nitrogen, kept under stirring and under a nitrogen gas flow at a small flow rate, and the content was allowed to melt under heating up to 170° C.

Into the molten sebacic acid, 6.683 kg of mixed xylylenediamine (34.35 mol of metaxylylenediamine from Mitsubishi Gas Chemical Company, Inc. and 14.72 mol of paraxylylenediamine from Mitsubishi Gas Chemical Company, Inc.), with a ratio by mass of metaxylylenediamine and paraxylylenediamine of 70/30, was added dropwise under stirring, and the inner temperature was continuously elevated up to 240° C. over 2.5 hours, while eliminating the produced condensation water out from the system.

After completion of the dropwise addition, the inner temperature was elevated, and upon reaching 250° C., the reaction vessel was evacuated, the inner temperature was further elevated, and the melt polycondensation reaction was allowed to proceed at 255° C. for 20 minutes. The system was then pressurized with nitrogen gas, the resultant polymerized product was taken out from the strand die and then pelletized, to thereby obtain polyamide resin MPXD10-3.

Polyamide resin MPXD10-3 was found to have a number-average molecular weight of 17500.

Example of Synthesis 4

Synthesis of MXD10

Polyamide resin MXD10 was obtained in the same way as in Example of Synthesis 1, except that 6.647 kg (48.80 mol) of metaxylylenediamine was used in place of 6.647 kg of mixed xylylenediamine containing metaxylylenediamine and paraxylylenediamine.

Polyamide resin MXD10 was found to have a number-average molecular weight of 14500.

Example of Synthesis 5

Synthesis of PXD10 (Comparative Resin)

In a reaction vessel equipped with a stirrer, a partial condenser, a total condenser, a thermometer, a dropping funnel, a nitrogen injection tube, and a strand die, placed were 10 kg (49.4 mol) of sebacic acid (TA Grade, from Itoh Oil Chemicals Co., Ltd.) and 1.35 g of sodium acetate/calcium hypophosphite (molar ratio=1/1.5), the system was fully replaced with nitrogen, kept under stirring and under a nitrogen gas flow at a small flow rate, and the content was allowed to melt under heating up to 190° C.

Into the molten sebacic acid, 6.647 kg (48.80 mol) of paraxylylenediamine (from Mitsubishi Gas Chemical Company, Inc.) was added dropwise under stirring, and the inner temperature was continuously elevated up to 280° C. over 2.5 hours, while eliminating the produced condensation water out from the system. After completion of the dropwise addition, the inner temperature was elevated, and upon reaching 290° C., the reaction vessel was evacuated, the inner temperature was further elevated, and the melt polycondensation reaction was allowed to proceed at 295° C. for 20 minutes. The system was then pressurized with nitrogen gas, the resultant polymerized product was taken out from the strand die and then pelletized, to thereby obtain polyamide resin PXD10.

Polyamide resin PXD10 was found to have a number-average molecular weight of 17000.

<Other Comparative Polyamide Resin>MXD6: metaxylylene adipamide resin (from Mitsubishi Gas Chemical Company, Inc., Grade S6007), number-average molecular weight=25000

Measurement of Terminal Amino Group Concentration>>

Dissolved was 0.5 g of each sample (polyamide resin) into 30 mL of phenol/ethanol=4/1 (v/v), 5 mL of methanol was added, and the solution was titrated with a 0.01 N hydrochloric acid using an automatic titrator (COM-2000, from Hiranuma Sangyo Co., Ltd.). A solution containing no sample was titrated in the same way to obtain a blank value, and the terminal amino group concentration was calculated from the equation below:

Terminal amino group concentration $(\mu eq/g)=(A-B)\times f\times 10/C$ (A: titration volume (mL), B: blank titration volume (mL), f: factor of titrant, C: amount of sample (g))

The factor f of the titrant used in Examples of this patent application was 1.006.

<Olefin-Maleic Anhydride Copolymer (B)>

ZeMac E-60: ethylene-maleic anhydride alternating copolymer, from Vertellus Specialties Incorporated, weight-average molecular weight (Mw)≈60,000

ZeMac E-400: ethylene-maleic anhydride alternating copolymer, from Vertellus Specialties Incorporated, weight-average molecular weight (Mw)≈400,000

Example 1

Per 100 parts by weight of (A) resin listed in Tables below, the amount (in parts by weight) of (B) component, as listed in Tables below, was precisely weighed and mixed in a tumbler, and the mixture was then fed into a twin-screw extruder (TEM37BS, from Toshiba Machine Co., Ltd.) from the base thereof, and melt-extruded to produce pellets. A preset temperature of the extruder was shown in Table below.

<<Relative Viscosity (RV)>>

The relative viscosity was measured in accordance with ISO 307. More specifically, 0.2 g of the obtained pellet was precisely weighed, and then dissolved into 20 ml of a 96% by weight sulfuric acid at 25° C. under stirring. After completely dissolved, 5 ml of the solution was quickly sampled into a Cannon Fenske viscometer, allowed to stand in a thermostat chamber at 25° C. for 10 minutes, and the fall time (t) was measured. The fall time (t0) of the 96% by weight sulfuric acid per se was measured in the same way. Using t and t0, the relative viscosity was calculated from the equation below.

Relative viscosity=t/t0

<<Tensile Breaking Stress>>

The tensile breaking stress was measured using a tensile tester ("Strograph APIII", from Toyo Seiki Seisaku-Sho, Ltd.), in accordance with JIS K7161 and JIS K7162.

More specifically, the pellet obtained above was dried at 120° C. for 5 hours, and injection-molded using an injection molding machine (Model "SE130DU-HP", from Sumitomo Heavy Industries, Ltd.), at the cylinder temperature listed in Tables below, a die temperature of 30° C., and a molding cycle time of 45 seconds, to thereby mold test pieces (No. 1A test pieces of 167 mm long). The obtained test pieces were annealed at 150° C. for one hour using a hot air dryer, and then subjected to the tensile test at a measurement temperature of 23° C., a humidity of 50%RH, a chuck-to-chuck distance of 115.0 mm, and tensile speed of 5 mm/min. Five test pieces were measured, and the results were averaged.

<<Tensile Break Induced Strain>>

The tensile break induced strain was measured using a tensile tester ("Strograph APIII", from Toyo Seiki Seisaku-Sho, Ltd.), in accordance with JIS K7161 and JIS K7162.

More specifically, the pellet obtained above was dried at 120° C. for 5 hours, and injection-molded using an injection molding machine (Model "SE130DU-HP", from Sumitomo Heavy Industries, Ltd.), at the cylinder temperature listed in Tables below, a die temperature of 30° C., and a molding cycle time of 45 seconds, to thereby mold test pieces (No. 1A test pieces of 167 mm long). The obtained test pieces were annealed at 150° C. for one hour using a hot air dryer, and then subjected to the tensile test at a measurement temperature of 23° C., a humidity of 50%RH, a chuck-to-chuck distance of 115.0 mm, and tensile speed of 5 mm/min. Five test pieces were measured, and the results were averaged.

<<Measurement of Unnotched Charpy Impact Strength>>

The pellet obtained above was dried at 120° C. for 5 hours, and then subjected to injection molding using an injection molding machine (Model "SE130DU-HP", from Sumitomo Heavy Industries, Ltd.), at the cylinder temperature listed in Tables below, a die temperature of 30° C., and a molding cycle time of 45 seconds, to thereby mold ISO multi-purpose test pieces (4 mm thick). The ISO multi-purpose test pieces were annealed at 150° C. for one hour using a hot air dryer, and then subjected to measurement of unnotched Charpy impact strength (in $kJ/m^2$) under an environment at a temperature of 23° C. and a humidity of 50%RH. Samples not broken under 5 J, which is the physical limit of tester) was denoted as NB.

<<Melt Viscosity>>

The melt viscosity of the pellet obtained above was measured using Capirograph 1C, from Toyo Seiki Seisaku-Sho, Ltd., at the temperature listed in Tables below, a retention time of 6 min, a nozzle diameter of 1 mm, a nozzle length of 10 mm, and a shear speed of $121.6\ s^{-1}$ or $1216\ s^{-1}$.

<<Extrusion Stability>>

Appearances of the strands obtained after kneading the polyamide resin (A) and the olefin-maleic anhydride copolymer (B) in the twin-screw extruder were observed. The strands extruded without problem were judged to be "stable", and those having grains visible thereon were judged to be "gellated".

<Other Examples and Comparative Examples>

Pellets of other Examples and Comparative Examples were manufactured in the same way as in Example 1, except that types of the polyamide resin (A), types of the additive (B), amounts of mixing, and the extrusion temperature were altered as summarized in Tables below. In Tables below, "-" in the cells corresponded to the types of (B) means absence of the olefin-maleic anhydride copolymer (B). "N66" means that polyamide 66 (Amilan CM30001-N, from Toray Industries, Inc.) was used.

Results are summarized in Tables below.

TABLE 1

|  | Unit | Comparative Example 1 | Example 1 | Example 2 | Comparative Example 2 | Comparative Example 3 | Comparative Example 4 |
|---|---|---|---|---|---|---|---|
| (A)Resin |  | MPXD10-1 | MPXD10-1 | MPXD10-1 | MPXD10-2 | MPXD10-3 | MPXD10-1 |
| Terminal amino group concentration of (A) | μeq/g |  | 18.2 |  | 6.5 | 35.5 | 18.2 |
| Melting point of (A) | ° C. |  | 215 |  | 215 | 215 | 215 |
| Product name of (B) |  | — |  |  | Zemac E60 |  |  |
| Content of (B) |  | — | 0.1 |  | 0.3 |  | 0.5 |
| Extrusion temperature | ° C. | 240 | 240 | 240 | 240 | 240 | 240 |
| RV(After extrusion) |  | 2.24 | 2.59 | 2.80 | 2.40 | — | 3.40 |
| Tensile breaking stress | MPa | 46.2 | 59.3 | 66 | 50 | — | 56.6 |

TABLE 1-continued

| | Unit | Comparative Example 1 | Example 1 | Example 2 | Comparative Example 2 | Comparative Example 3 | Comparative Example 4 |
|---|---|---|---|---|---|---|---|
| Tensile break induced strain | % | 8.3 | 231.6 | 240.7 | 14.4 | — | 94.9 |
| Unnotched Charpy impact strength | kJ/m$^2$ | 30.0 | 166.0 | 187.0 | 51.9 | — | 184.9 |
| Cylinder temperature | °C. | | | | 250 | | |
| Temperature of measuring melt viscosity | °C. | | | | 250 | | |
| 6 min 121.6 s$^{-1}$ | Pa·s | 373 | 757 | 991 | 580 | — | 2104 |
| 6 min 1216 s$^{-1}$ | Pa·s | 200 | 306 | 354 | 255 | — | 582 |
| Extrusion stability | | stable | stable | stable | stable | gellated | stable |

TABLE 2

| | Unit | Example 3 | Comparative Example 5 | Comparative Example 6 | Example 4 | Comparative Example 7 | Comparative Example 8 | Comparative Example 9 | Comparative Example 10 |
|---|---|---|---|---|---|---|---|---|---|
| (A) Resin | | MPXD10-1 | | MXD10 | | PXD10 | | MXD6 | |
| Terminal amino group concentration of (A) | μeq/g | 18.2 | | 28.7 | | 25.7 | | 20.5 | |
| Melting point of (A) | °C. | 215 | | 190 | | 290 | | 237 | |
| Product name of (B) | | Zemac E400 | | — | Zemac E60 | — | Zemac E60 | — | Zemac E60 |
| Content of (B) | | 0.3 | 0.5 | — | 0.3 | — | 0.3 | — | 0.3 |
| Extrusion temperature | °C. | 240 | 240 | 220 | 220 | 300 | 300 | 260 | 260 |
| RV(After extrusion) | | 2.55 | — | 2.38 | 2.88 | 2.37 | 2.8 | 2.7 | 3.13 |
| Tensile breaking stress | MPa | 61.8 | 55.1 | 66.1 | 66.6 | 70 | 82.9 | 105.8 | 89.8 |
| Tensile break induced strain | % | 239.6 | 10.8 | 3 | 217.4 | 20.4 | 11 | 8.7 | 8.8 |
| Unnotched Charpy impact strength | kJ/m$^2$ | 196.8 | 191.3 | 22.6 | 79.1 | NB | NB(50%)-87 | 54.6 | 64.1 |
| Cylinder temperature | °C. | | 250 | | | 300 | | 260 | |
| Temperature of measuring melt viscosity | °C. | | 250 | | | 300 | | 260 | |
| 6 min 121.6 s$^{-1}$ | Pa·s | 777 | 1886 | 340 | 1057 | 403 | 422 | 519 | 831 |
| 6 min 1216 s$^{-1}$ | Pa·s | 310 | 545 | 187 | 380 | 156 | 167 | 225 | 329 |
| Extrusion stability | | stable | stable | stable | stable | stable | stable | stable | stable |

TABLE 3

| | Unit | Comparative Example 11 | Comparative Example 12 |
|---|---|---|---|
| (A) Resin | | N66 | |
| Terminal amino group concentration of (A) | μeq/g | 29.8 | |
| Melting point of (A) | °C. | 265 | |
| Product name of (B) | | — | Zemac E60 |
| Content of (B) | | — | 0.3 |
| Extrusion temperature | °C. | 280 | 280 |
| RV(After extrusion) | | 2.70 | 2.90 |
| Tensile breaking stress | MPa | 60.0 | 63.2 |
| Tensile break induced strain | % | 50.0 | 43.3 |
| Unnotched Charpy impact strength | kJ/m$^2$ | NB | NB |
| Cylinder temperature | °C. | 280 | 280 |
| Temperature of measuring melt viscosity | °C. | 280 | 280 |
| 6 min 121.6 s$^{-1}$ | Pa·s | 133 | 144 |
| 6 min 1216 s$^{-1}$ | Pa·s | 95 | 103 |
| Extrusion stability | | stable | stable |

As is clear from the results, the polyamide resin compositions of this invention were found to have high toughness (unnotched Charpy impact strength) and high breaking strain (tensile break induced strain) (Examples 1 to 4).

In contrast, all of polyamide resin compositions containing no olefin-maleic anhydride copolymer (B) (Comparative Examples 1, 6, 7, 9), those containing excessive amounts of olefin-maleic anhydride copolymer (B) (Comparative Examples 4, 5), those containing the polyamide resin (A) but the compositions thereof are not the predetermined ones (Comparative Examples 7 to 10), and those containing the polyamide resin (A) but the terminal amino group concentration thereof fall outside the predetermined range (Comparative Examples 2, 3) were found to be inferior in terms of at least one of toughness and breaking strain.

When compared among the polyamide resin compositions that employed polyamide 66, a popular polyamide resin, as the polyamide resin, rather than using the predetermined polyamide resin (A), the one having no olefin-maleic anhydride copolymer (B) mixed therein was found to show a slightly higher fracture stress (tensile break induced strain). This clearly indicates that the olefin-maleic anhydride copolymer (B) does not contribute to improve the fracture stress. Polyamide 66, intrinsically having a high toughness, did not demonstrate a large improvement effect on the toughness, as demonstrated by the polyamide resin composition of this invention.

In conclusion from the results, by combining the predetermined polyamide resin (A) and the predetermined olefin-maleic anhydride copolymer (B), it now becomes possible to obtain the polyamide resin composition with high toughness (unnotched Charpy impact strength) and high breaking strain (tensile break induced strain).

The invention claimed is:
1. A polyamide resin composition comprising:
   100 parts by weight of polyamide resin (A) that is composed of a structural unit derived from diamine and a structural unit derived from dicarboxylic acid, and

0.05 to 0.45 parts by weight of an olefin-maleic anhydride copolymer (B),
wherein 50 mol % or more of the structural unit derived from diamine is derived from at least one of metaxylylenediamine and a combination of metaxylylenediamine and paraxylylenediamine;
the molar ratio of the structural unit derived from metaxylylenediamine and the structural unit derived from paraxylylenediamine is 100:0 to 40:60;
50 mol % or more of the structural unit derived from dicarboxylic acid is derived from sebacic acid; and
the polyamide resin (A) has a terminal amino group concentration of 10 to 30 μeq/g,
wherein the polyamide resin composition is free from inorganic fillers in granular form.

2. The polyamide resin composition of claim 1, wherein the molar ratio of olefin and maleic anhydride that composes the olefin-maleic anhydride copolymer (B) is 1:0.5 to 1:1.5.

3. The polyamide resin composition of claim 1, wherein the olefin is ethylene.

4. The polyamide resin composition of claim 1, wherein the polyamide resin (A) has a melt viscosity of 600 to 1500 Pa·s when measured at 250° C., under a retention time of 6 minutes and a shear rate of 121.6 $s^{-1}$.

5. The polyamide resin composition of claim 1, wherein the polyamide resin (A) has a melt viscosity measured at 250° C., under a retention time of 6 minutes, and a shear rate of 121.6 $s^{-1}$ of 260 to 500 Pa·s.

6. The polyamide resin composition of claim 1, wherein the polyamide resin composition has a relative viscosity measured in accordance with ISO 307 of 1.6 to 3.2.

7. The polyamide resin composition of claim 1, wherein the molar ratio of the structural unit derived from metaxylylenediamine and the structural unit derived from paraxylylenediamine is 100:0 to 51:49.

8. The polyamide resin composition of claim 1, wherein 70 mol % or more of the structural unit derived from diamine is derived from at least one of metaxylylenediamine and a combination of metaxylylenediamine and paraxylylenediamine.

9. The polyamide resin composition of claim 1, wherein the polyamide resin (A) has a terminal amino group concentration of 15 to 25 μeq/g.

10. A molded article obtained by molding the polyamide resin composition described in claim 1.

11. A method for manufacturing the molded article, comprising injection-molding of the polyamide resin composition described in claim 1.

12. The polyamide resin composition of claim 1, wherein the polyamide resin composition contains 70% by weight or more of the polyamide resin.

13. The polyamide resin composition of claim 1, wherein the olefin-maleic anhydride copolymer (B) is present in an amount of 0.05 to less than 0.3 parts by weight.

* * * * *